Feb. 2, 1954     G. LUDWIG ET AL     2,667,789
CONVEYER BELT
Filed Aug. 26, 1950

Inventors
Georg Ludwig
Hans Gandert
by Singer, Stern & Carlberg
Attorneys

Patented Feb. 2, 1954

2,667,789

UNITED STATES PATENT OFFICE 2,667,789

CONVEYER BELT

Georg Ludwig, Hamburg-Harburg, and Hans Gandert, Hamburg-Marmsdorf, Germany

Application August 26, 1950, Serial No. 181,596

1 Claim. (Cl. 74—232)

This invention relates to improvements in conveyor belts and more particularly to an improved wear- and fray-resisting conveyor belt structure for belts of the rubber type built up with layers of cotton duck, fabric or the like.

In rubber-type conveyor belts built up with layers or plies of duck or fabric and having rubber edges for the purpose of improving the wear- and abrasion-resistance of the belt and to cement the several layers of fabric together, said edges are usually reenforced and partly or entirely embraced by textile threads or woven fabric strips to prevent tear-off of them throughout the whole length of the belt if fraying at one spot occurs. The wear-resistance and resistance against tear-off of the rubber edges of such belts are materially increased by increasing the cross-section of the rubber edges embraced by the fabric strips. On the other hand, however, the abrasive wear on the embracing fabric strips increases with increased cross-section of the rubber edges. On account thereof, such fabric strips rub through in time and the intimate and tight connection between the rubber edges and the body of fabric layers of the belt is impaired.

The objects of this invention are, first, to avoid the difficulties encountered with rubber edges in belts of the described type and to eliminate such rubber edges entirely, replacing them by edges of abrasion-resisting fibrous material such as fabric, yarns, strings, or rubberized textile fibrils; and, second, to provide an improved conveyor belt of high abrasion-resisting quality having increased life.

Figure 1:
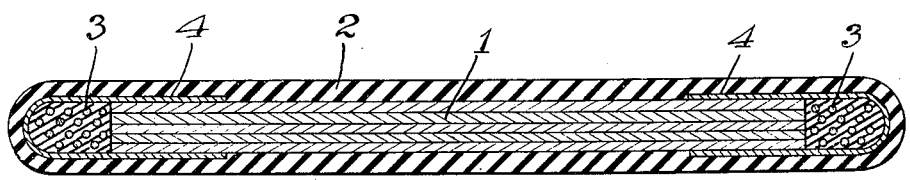
Figure 2:
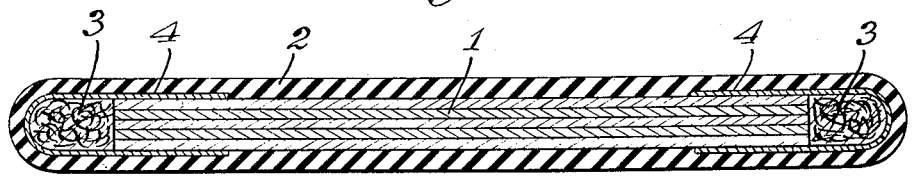

The invention will now be described in greater detail in connection with the accompanying drawing showing two preferred forms of it, and in which Fig. 1 is a cross-section through a belt having abrasion-resisting edges of a system of yarn strings; and Fig. 2 is a cross-section through a belt of somewhat modified structure having abrasion-resisting edges of rubberized textile fibrils.

The belt shown in cross-section in both figures of the drawing comprises the main body 1 of the belt built up in usual manner with layers of cotton duck or the like, the surrounding rubber covering 2, and the abrasion-resisting edges 3 which are positioned in the same plane as the main body and are secured to the main body of the belt by woven textile strips 4. The abrasion-resisting edges 3, according to this invention, may be of any suitable fibrous material, such as threads or yarns running lengthwise on both lateral edges of the main body of the belt and being embedded in rubber, as indicated in Fig. 1; or, they may consist of a mixture of rubber and fine textile fibrils, as indicated in Fig. 2. The textile fibrils employed, are thereby preferably of high abrasion-resisting quality and their proportion in the mixture amounts preferably to more than 50%. Other suitable materials, as for instance, rubberized woven fabric or other compositions may be used for the abrasion-resisting edges, according to the principles of this invention. In both constructions shown in the drawing, the main body of the belt 1 and the abrasion-resisting edges 3 are surrounded by a rubber covering 2. When, in these constructions, the rubber covering frays through and the abrasion-resisting edges are thereby exposed, the latter, due to their extreme toughness, offer considerable resistance against further wear, especially if the edges 3 contain each a plurality of tightly twisted yarn strings. The carrying structure of the belt, comprising the duck layers of the main body, is thus additionally and effectively protected from external mechanical influences which fact increases the life of the belt considerably.

As regards the construction according to Fig. 2, in which the abrasion-resisting edges are composed of fibril-bearing rubber, it must be mentioned that it offers especially good anti-fraying qualities combined with retention of the flexibility of the belt in longitudinal direction. It is also possible to construct a belt with abrasion-resisting edges, according to the features of this invention, without the surrounding rubber covering 2. Other modifications may occur to those skilled in the art without departing from the essentials of this invention and within the spirit and scope thereof, as defined by the appended claim.

What we claim is:

A conveyor belt comprising a main body of a plurality of layers of woven material, separate wear resisting edge members having a thickness equal to the total thickness of said plurality of layers positioned along the opposite longitudinal edges of said main body and arranged in the same plane with the latter, a single layer of woven textile strips embracing the exposed surfaces of said edge members and extending over and secured to the marginal portions of said main body, whereby said edge members are united with said main body, said edge members consisting each of a plurality of tightly twisted yarn strings extending lengthwise of the longitudinal edges of said main body and embedded in rubber, and a rubber covering extending over both faces of the main body and the textile strips securing said edge members to said main body.

GEORG LUDWIG.
HANS GANDERT.

References Cited in the file of this patent

UNITED STATES PATENTS

| Number | Name | Date |
|---|---|---|
| 975,560 | Metzler | Nov. 15, 1910 |
| 1,969,792 | Gates | Aug. 14, 1934 |
| 2,141,796 | Loges | Dec. 27, 1938 |
| 2,403,617 | Skeyhan | July 9, 1946 |